(12) United States Patent
Kwak et al.

(10) Patent No.: US 10,906,350 B2
(45) Date of Patent: Feb. 2, 2021

(54) PATTERN FORMING METHOD FOR QUARTZ SURFACE AND PATTERN FORMING DEVICE FOR QUARTZ SURFACE

(71) Applicant: LG HAUSYS, LTD., Seoul (KR)

(72) Inventors: Jin Seok Kwak, Cheongju-si (KR);
Suk Whan Ko, Acworth, GA (US);
Joong Heon Lee, Kennesaw, GA (US);
Ju Yeon Won, Marietta, GA (US);
Jung Sang Lee, Marietta, GA (US);
Paul Lee, Cartersville, GA (US); Yang Won Yun, Kennesaw, GA (US); Chung Man Kim, Buford, GA (US)

(73) Assignee: LG Hausys, Ltd., Seoul (KR)

( * ) Notice: Subject to any disclaimer, the term of this patent is extended or adjusted under 35 U.S.C. 154(b) by 380 days.

(21) Appl. No.: 15/813,665

(22) Filed: Nov. 15, 2017

(65) Prior Publication Data

US 2019/0143743 A1 May 16, 2019

(51) Int. Cl.
| | |
|---|---|
| *B29C 67/00* | (2017.01) |
| *B44F 9/04* | (2006.01) |
| *C04B 14/06* | (2006.01) |
| *B28B 1/00* | (2006.01) |
| *B28B 13/02* | (2006.01) |
| *E04F 13/18* | (2006.01) |
| *B29C 67/24* | (2006.01) |
| *B28B 11/10* | (2006.01) |

(52) U.S. Cl.
CPC ............... *B44F 9/04* (2013.01); *B28B 1/005* (2013.01); *B28B 11/10* (2013.01); *B28B 13/027* (2013.01); *B28B 13/029* (2013.01); *B28B 13/0295* (2013.01); *B29C 67/243* (2013.01); *C04B 14/06* (2013.01); *E04F 13/185* (2013.01)

(58) Field of Classification Search
CPC ..................................................... B28B 1/005
See application file for complete search history.

(56) References Cited

U.S. PATENT DOCUMENTS 9,707,698 B1 * 7/2017 Xie ........................... B28C 7/02
2017/0355101 A1 * 12/2017 Toncelli ............. B28B 13/0295

FOREIGN PATENT DOCUMENTS

| EP | 1403019 A2 | 3/2004 |
| EP | 1543929 A1 | 6/2005 |
| GB | 944706 A | 12/1963 |
| WO | 2005090034 A1 | 9/2005 |
| WO | 2016113652 A1 | 7/2016 |

* cited by examiner

*Primary Examiner* — Ryan M Ochylski
(74) *Attorney, Agent, or Firm* — Dentons US LLP

(57) ABSTRACT

The present application relates to a pattern forming method for quartz surface and a pattern forming device for quartz surface. According to the pattern forming method for quartz surface of the present application, by comprising a step of forming a pattern and a step of forming a color, it is possible to freely express the color on the pattern simultaneously along with forming the pattern on the quartz surface. And, in addition to these steps, by optionally comprising a step of additionally forming a pattern, it is possible to freely form a desired pattern on the quartz surface, and, by adding long line type patterns on the quartz surface unlike existing conventional quartz surfaces, it is possible to produce the quartz surface showing patterns and textures which are more natural and close to natural stone.

12 Claims, 7 Drawing Sheets

[Figure 1]
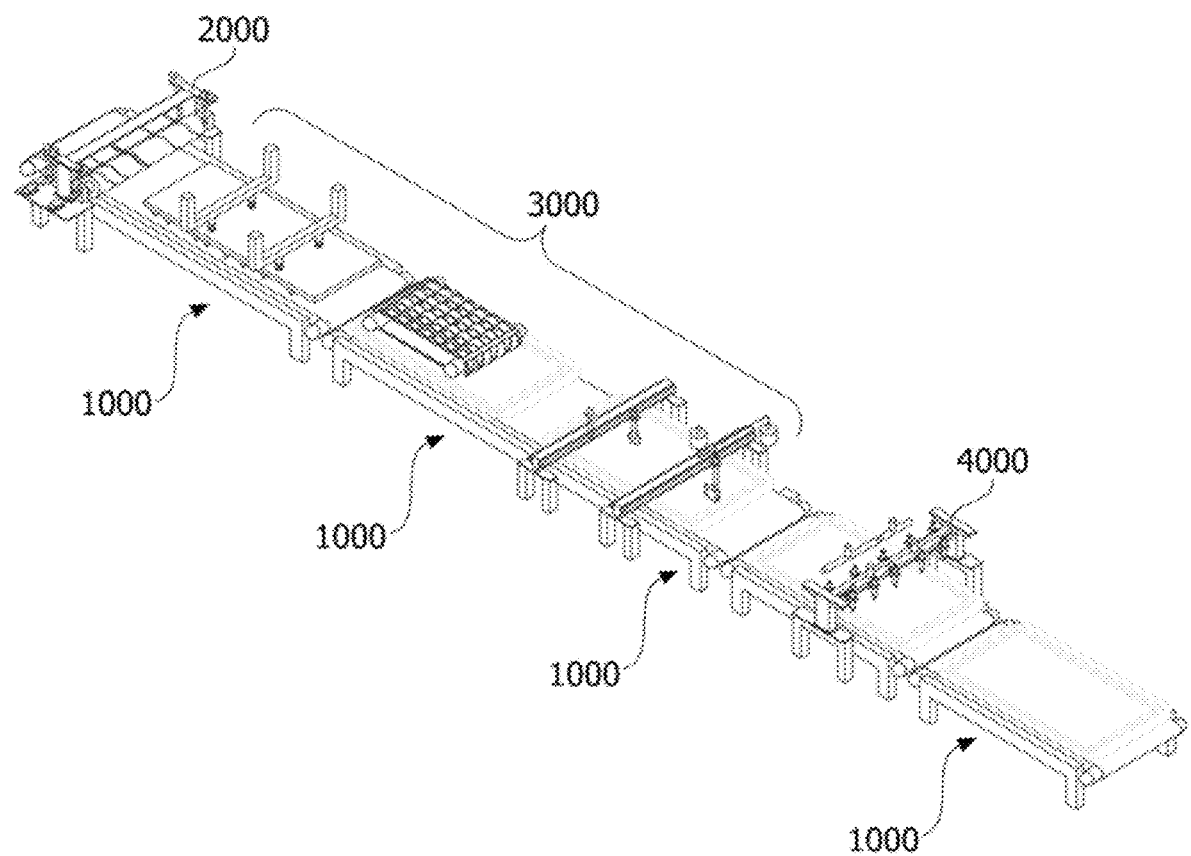

[Figure 2]
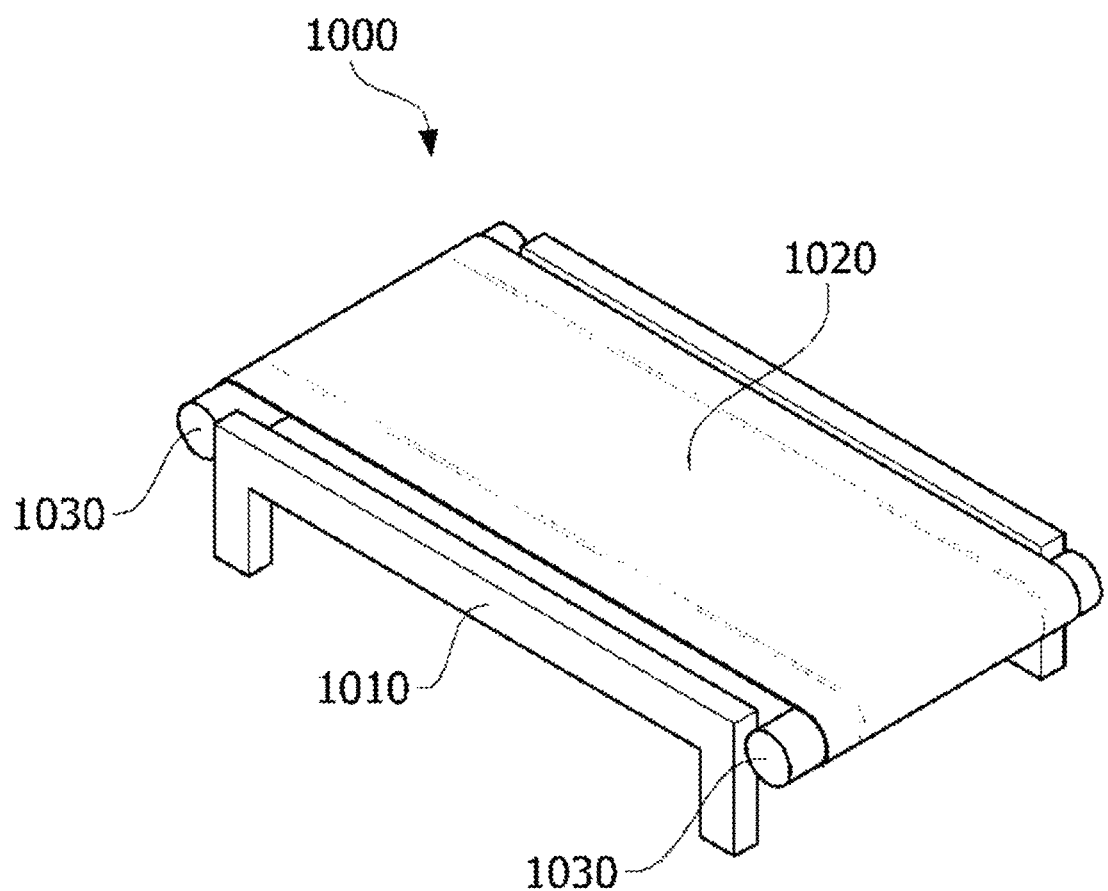

[Figure 3]
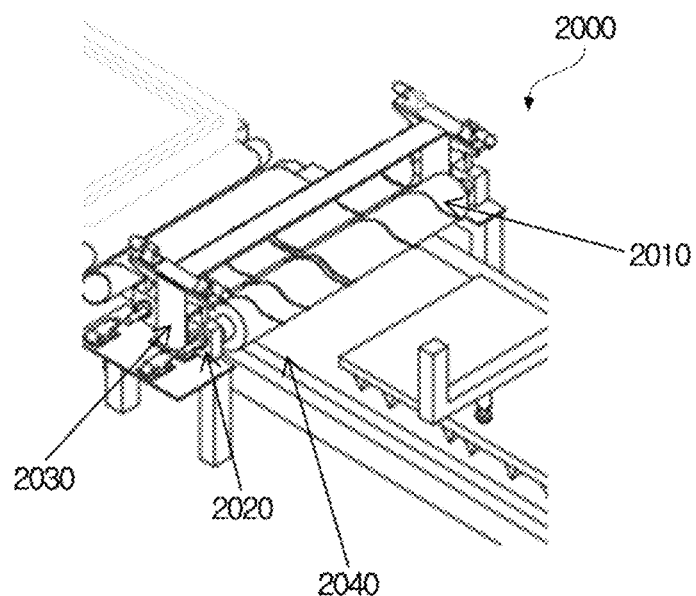
[Figure 4]
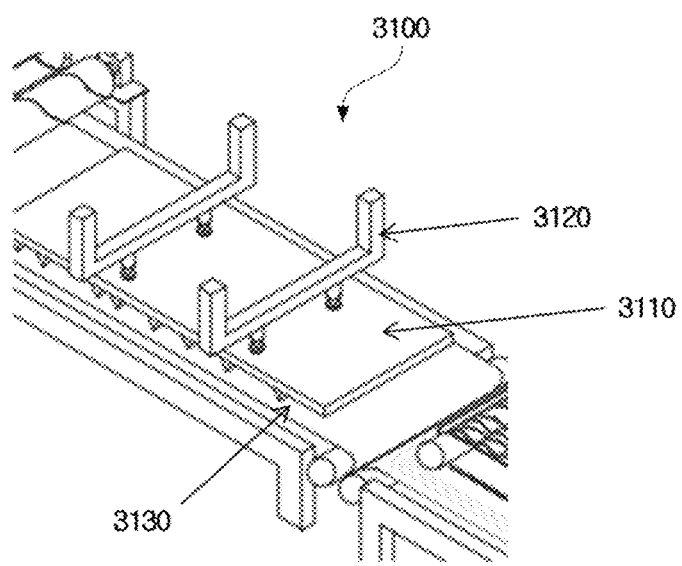

[Figure 5]
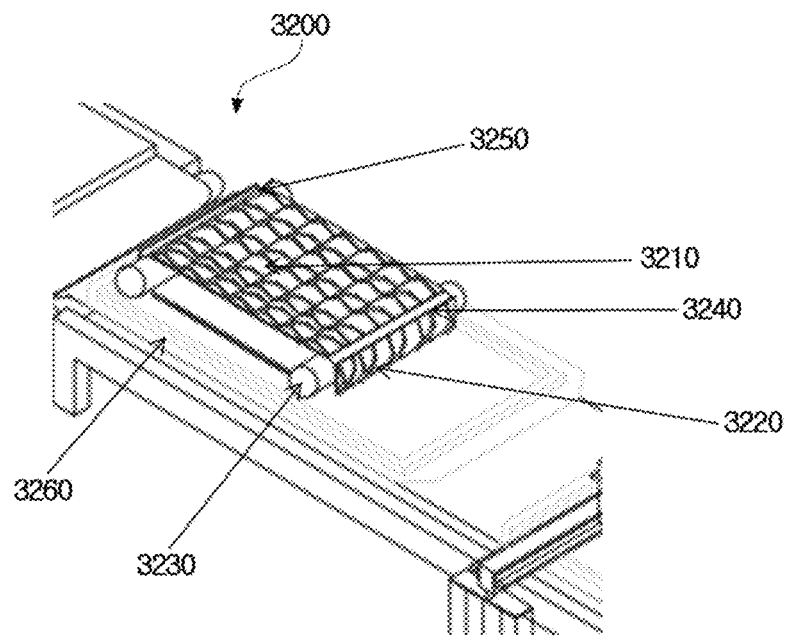
[Figure 6]
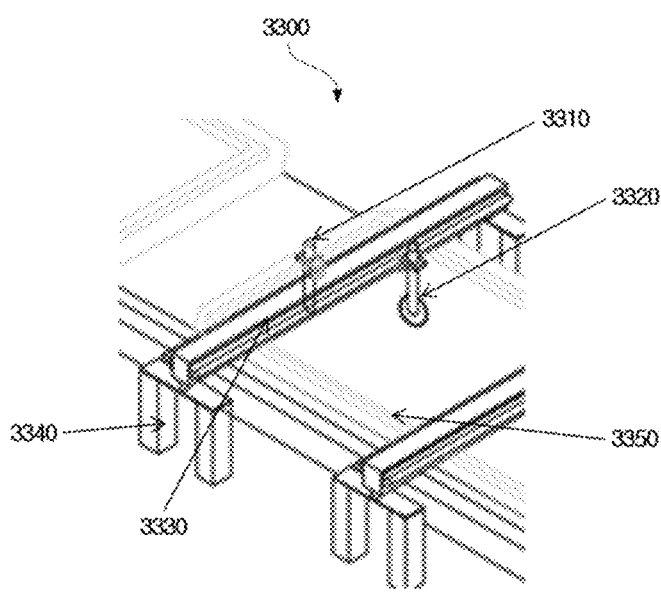

[Figure 7]
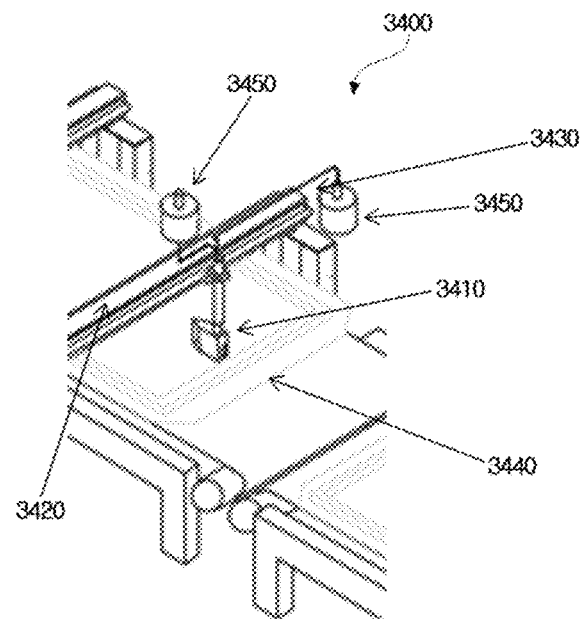
[Figure 8]
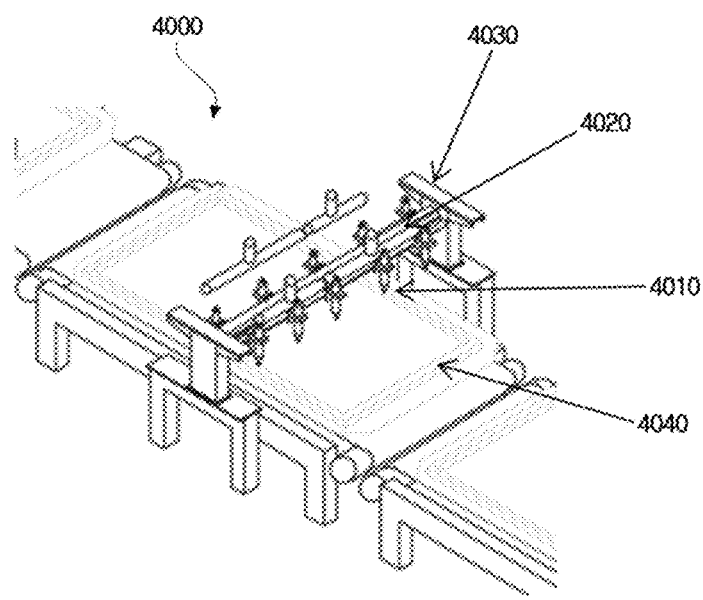

[Figure 9]
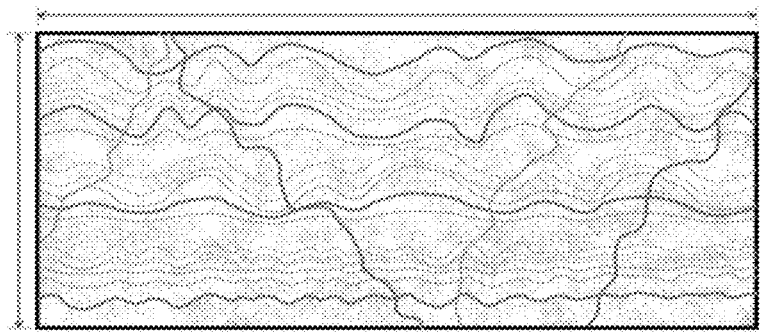
[Figure 10]
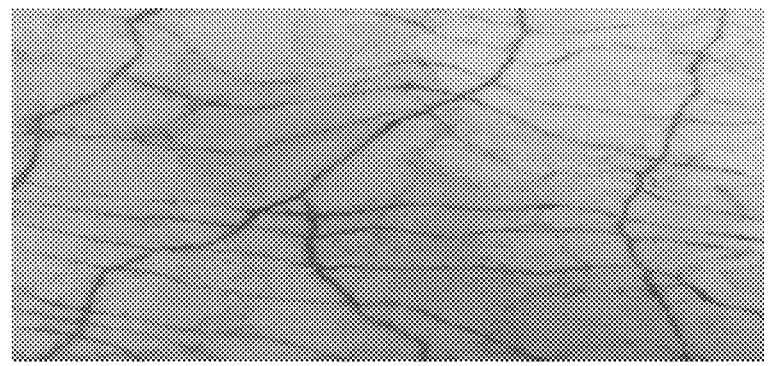

[Figure 11]
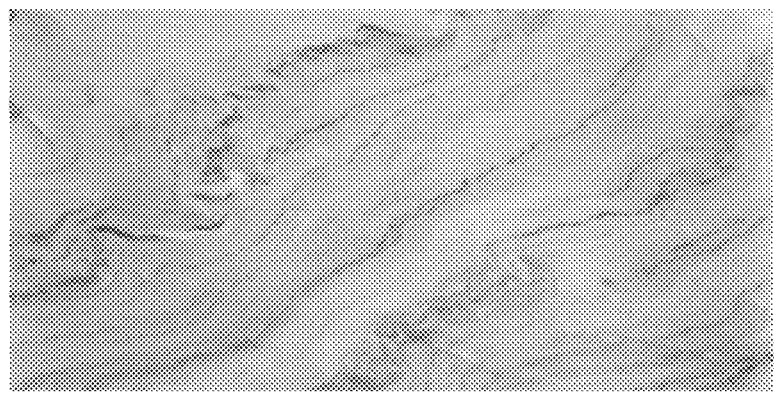
[Figure 12]
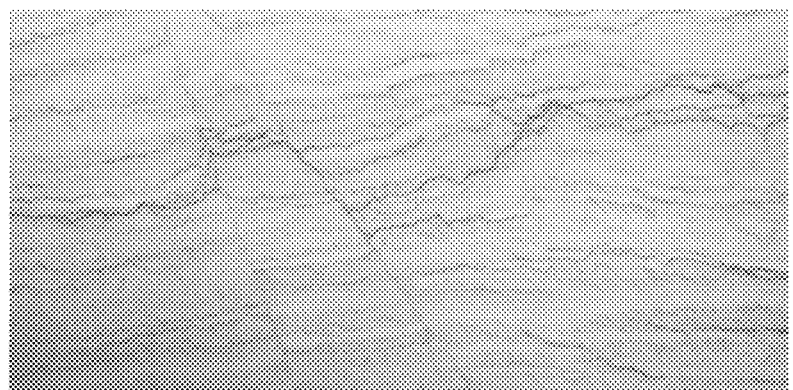

PATTERN FORMING METHOD FOR QUARTZ SURFACE AND PATTERN FORMING DEVICE FOR QUARTZ SURFACE

TECHNICAL FIELD

The present application relates to a pattern forming method for quartz surface and a pattern forming device for quartz surface.

BACKGROUND ART

Quartz surface, which is recently utilized as an architectural interior material, is lighter than natural quartz surface and has excellent workability, and thus is diversely used as a substitute for natural quartz surface in various top plates such as floorings, wall materials, table, kitchen, plates and washing dresser, and the like.

Quartz Surfaces are required to have patterns and textures similar to natural stone.

In order to solve this problem, conventional quartz surface has been mainly made of acrylic resins. Specifically, the quartz surface using the acrylic resin has been produced by mixing a compound mixed a monomer such as methyl methacrylate with a polymethyl methacrylate, with a pigment, a curing agent and other additives, and then injecting it into a mold, and curing it.

However, the quartz surface developed to date has problems that the product itself is planar and it is impossible to continuously produce stereoscopic patterns such as irregularities on the quartz surface. Therefore, to solve such a problem, a pattern forming method for quartz surface has been demanded.

DISCLOSURE

Technical Problem

The present application provides a pattern forming method for quartz surface and a pattern forming device for quartz surface which can intervene without affecting conventional quartz surface manufacturing devices and form patterns and textures that are more natural and close to natural stone by adding long line type patterns unlike conventional quartz surfaces.

Technical Solution

The present application relates to a pattern forming method for quartz surface. According to an exemplary pattern forming device for the quartz surface of the present application, by comprising a pattern forming part and a color forming part, it is possible to freely express the color on the pattern simultaneously along with forming the pattern on the quartz surface. And, in addition to these parts, by optionally comprising an additional pattern forming part, it is possible to freely form a desired pattern on the quartz surface, and, by adding long line type patterns on the quartz surface unlike existing conventional quartz surfaces, it is possible to produce the quartz surface showing patterns and textures which are more natural and close to natural stone.

Effects of Invention

According to the pattern forming device for quartz surface of the present application, it is possible to freely express the color on the pattern simultaneously with forming the pattern and to freely form a desired pattern, and by adding long line type patterns unlike conventional quartz surfaces, it is possible to produce quartz surfaces showing patterns and textures which are more natural and close to natural stone.

BRIEF DESCRIPTION OF DRAWINGS

FIG. 1 is a view schematically showing a pattern forming device for quartz surface according to one embodiment of the present application.

FIG. 2 is a view schematically showing a transfer part according to one embodiment of the present application.

FIG. 3 is a view schematically showing a pattern forming part according to one embodiment of the present application.

FIG. 4 is a view schematically showing a first additional pattern forming part according to one embodiment of the present application.

FIG. 5 is a view schematically showing a second additional pattern forming part according to one embodiment of the present application.

FIG. 6 is a view schematically showing a third additional pattern forming part according to one embodiment of the present application.

FIG. 7 is a view schematically showing a fourth additional pattern forming part according to one embodiment of the present application.

FIG. 8 is a view schematically showing a color forming part according to one embodiment of the present application.

FIGS. 9 to 12 are images capturing quartz surfaces produced by the pattern forming device and method for quartz surface of the present application according to one embodiment.

MODE FOR INVENTION

The present application relates to pattern forming method for quartz surface. An exemplary pattern forming method for quartz surface of the present application comprises steps of transferring, forming a pattern and forming a color.

In this specification, the term "quartz surface" may be referred to as "artificial marble". The term "sequentially" means to be enumerated by a serial structure in order.

In one example, the step of transferring is a step for transferring a semi-finished quartz surface. The semi-finished product means a state in which the quartz surface is uncured or semi-cured to form patterns on the quartz surface.

For example, the semi-finished product of quartz surface can be prepared by producing all kinds of semi-finished products of quartz surface known in the art in a manufactured state or by directly producing them. For example, the semi-finished product of quartz surface can be directly produced through steps of mixing a composition of quartz surface comprising 30 to 60% of an inorganic material, 5 to 10% of a binder resin, 1 to 1.5% of a curing agent, 0.5 to 1.5% of an adhesion promoter, 0.01 to 0.2% of a promoting material and 0.1 to 10% of a pigment, dispersing the mixed mixture in a mold and then pre-pressing the mixture to achieve the height and dispersion thereof, without being limited thereto.

The step of forming a pattern is a step for forming a pattern on the surface of the semi-finished product of quartz surface transferred in the step of transferring. In one example, the pattern may form incised patterns on the semi-finished product of quartz surface by rotating a roller and simultaneously pressing a shape embossed on the surface of the roller, on the surface of the semi-finished product of quartz surface. The shape embossed on the surface of the roller may be a disk shape or a spring shape having curves, and the surface of the semi-finished product of quartz surface may be patterned by a linear pattern or a slash pattern in a longitudinal direction.

The pattern forming method for quartz surface of the present application may further comprise a step of additionally forming a pattern. The step of additionally forming a pattern is a step for further forming at least one pattern on the surface of the semi-finished product of quartz surface in which the pattern is formed in the step of forming a pattern.

The step of additionally forming a pattern may further comprise forming a first, second, third, or fourth additional pattern forming step to further form one or more patterns. As the pattern forming method for quartz surface comprises an additional pattern forming step, it can form a desired pattern, and by adding long line type patterns unlike conventional quartz surfaces, it is possible to produce quartz surfaces showing patterns and textures which are more natural and close to natural stone.

The first additional pattern step is a step for pressing a plate having at least one protrusion to form a pattern. In one example, in the first additional pattern step, a plate having protrusions may be pressed on the surface of the semi-finished product of quartz surface to form an engraved pattern.

The plate having protrusion may comprise at least one protrusion, but is not limited thereto. For example, the plate having protrusion may realize the engraved pattern on the entire of semi-finished product of quartz surface by a single operation. At this time, the shape of the engraved pattern may be embodied according to the pattern of the protrusion shape, where the pattern of the protrusion may be controlled with a desired pattern to form the desired pattern of the quartz surface. In addition, in the first additional pattern forming step, by controlling the height and width of the protrusion on the surface of the plate, it is possible to freely form the depth and width of the pattern formed on the quartz surface to the desired size.

The second additional pattern formation step is a step for pressing plates, in which two or more slot shapes are embossed, in a caterpillar manner to form a pattern. The caterpillar manner means a manner in which a variety of slot-shaped steel plate pieces are connected in a chain shape and these are hung on a rotation drive device such as a wheel like a belt and operated by rotation with power. In the second additional pattern formation step, by controlling the number or width of two or more embossed slot shapes formed on the plate, it is possible to freely form the depth and width of the pattern formed on the quartz surface to the desired size.

The third additional pattern forming step is a step for pressing a knife and a wheel to form a pattern. Specifically, in the third additional pattern forming step, by moving the position of the knife and the wheel by a drive unit for moving up, down, left or right and pressing the surface of the semi-finished product of quartz surface, it is possible to freely form the depth and width of the engraved pattern formed on the semi-finished product of quartz surface to the desired size. In addition, the depth and width of the engraved pattern formed on the semi-finished product of quartz surface may be freely formed according to the length and thickness of the knife and the wheel.

The fourth additional pattern formation step is a step for pressing a plow to form a pattern. Specifically, in the fourth additional pattern formation step, by moving the position of the plow by a drive unit for moving up, down, left or right and pressing the surface of the semi-finished product of quartz surface, it is possible to freely form the depth and width of the engraved pattern formed on the semi-finished product of quartz surface to the desired size. In addition, the depth and width of the engraved pattern formed on the semi-finished product of quartz surface may be freely formed according to the length and thickness of the plow.

The fourth additional pattern formation step may further comprise a step of supplying a color.

The step of supplying a color is a step of forming an engraved pattern on the semi-finished product of quartz surface and forming a color in the pattern simultaneously. Specifically, in the step of supplying a color, a color raw material may be supplied to the plow, whereby it is possible to form the engraved pattern on the semi-finished product of quartz surface and freely express the color on the pattern simultaneously.

The step of forming a color is a step for forming a color on the pattern formed on the semi-finished product of quartz surface in which the pattern is formed. By forming a color on the pattern formed on the semi-finished product of quartz surface, it is possible to form the pattern and freely express the color on the pattern simultaneously.

The present application also relates to a pattern forming device for quartz surface. Hereinafter, the pattern forming device for quartz surface of the present application will be described with reference to the attached drawings, which are illustrative, and the pattern forming device for quartz surface of the present application is not limited to the attached drawings.

FIG. 1 is a view schematically showing a pattern forming device for quartz surface according to one embodiment of the present application. As shown in FIG. 1, the pattern forming device for quartz surface of the present application comprises a transfer part (1000), a pattern forming part (2000) and a color forming part (4000). At this time, the pattern forming part (2000) and the color forming part (4000) are sequentially positioned on the transfer part (1000).

In one example, the transfer part (1000) is a part for transferring a semi-finished product of quartz surface. The semi-finished product means a state in which the quartz surface is already cured or semi-cured to form patterns on the quartz surface.

For example, the semi-finished product of quartz surface can be prepared by producing all kinds of semi-finished products of quartz surface known in the art in a manufactured state or by directly producing them. For example, the semi-finished product of quartz surface can be directly produced through steps of mixing a composition of quartz surface comprising 30 to 60% of an inorganic material, 5 to 10% of a binder resin, 1 to 1.5% of a curing agent, 0.5 to 1.5% of an adhesion promoter, 0.01 to 0.2% of a promoting material and 0.1 to 10% of a pigment, dispersing the mixed mixture in a mold and then pre-pressing the mixture to achieve the height and dispersion thereof, without being limited thereto.

FIG. 2 is a view schematically showing a transfer part according to one embodiment of the present application. As shown in FIG. 2, the transfer part (1000) may comprise a support (1010), a belt (1020) and a first rotation drive unit (1030).

The support (1010) is a unit for supporting the pattern forming part (2000) and the color forming part (4000). One or more of the supports (1010) may be included in the transfer part (1000). For example, the support (1010) may comprise one to support the pattern forming part (2000) and the color forming part (4000), and also comprise two to support the pattern forming part (2000) and the color forming part (4000), respectively, without being limited thereto.

The belt (1020) is a unit for conveying the semi-finished product of quartz surface. The belt (1020) may be positioned on the support (1010). The belt (1020) may be formed of a material having a flat surface to prevent surface deformation of the semi-finished product of quartz surface.

The first rotation drive unit (1030) is a unit for rotationally driving the belt (1020). The first rotation drive unit (1030) may be located inside the belt (1020). For example, two or more of the first rotation drive units (1030) may be located inside the belt (1020) to rotationally drive the belt (1020) in a tight state, without being limited thereto. The belt (1020) is driven in a tight state by the first rotation drive unit (1030) so that the semi-finished product of quartz surface can be stably transported on the belt (1020).

In one example, the pattern forming part (2000) is a part for forming a pattern on the semi-finished product of quartz surface conveyed by the transfer part (1000). FIG. 3 is a view schematically showing a pattern forming part according to one embodiment of the present application. As shown in FIG. 3, the pattern forming part (2000) may comprise a roller (2010), a motor (2020), a first up-down adjustment unit (2030) and a first sensor (2040).

The roller (2010) is a unit for forming incised patterns on the semi-finished product of quartz surface by pressing a shape embossed on the surface of the roller (2010), on the surface of the semi-finished product of quartz surface with rotating it. The roller (2010) may be formed by a disk shape or a spring shape having curves in one or more embossments, without being limited thereto. A linear pattern or a slash pattern may be realized on the semi-finished product of quartz surface in a longitudinal direction by the roller (2010).

The motor (2020) is a unit for adjusting a speed of the roller (2010). The motors (2020) may be each located at both ends of the roller (2010). The motors (2020) may be each positioned at both ends of the roller (2010) to freely adjust the speed of the roller (2010). At this time, the speed of the roller (2010) is not particularly limited.

The first up-down adjustment unit (2030) is a unit for adjusting the height of the roller (2010). The first up-down adjustment units (2030) may connect the roller (2010) and the motors (2020), and be located at outsides of the motors (2020) each located at both ends of the roller (2010). The first up-down adjustment unit (2030) may freely form the desired depth and width of the pattern incised on the semi-finished product of quartz surface by adjusting the height of the roller (2010).

The first sensor (2040) is a unit for sensing a position to form a pattern on the semi-finished product of quartz surface. The first sensor (2040) may be positioned on the transfer part (1000). By comprising the first sensor (2040) in the pattern forming part (2000), it is possible to sense a starting point for forming a pattern on the semi-finished product of quartz surface conveyed by the transfer part (1000) and to form a pattern at a desired position.

In another example, the pattern forming device for quartz surface of the present application may further comprise an additional pattern forming part. As shown in FIG. 1, the additional pattern forming part (3000) is a portion for further forming at least one pattern on the semi-finished product of quartz surface in which the pattern is formed in the pattern forming part (2000).

The additional pattern forming part (3000) may further comprise a first, second, third, or fourth additional pattern forming part to further form one or more patterns. As the pattern forming device for quartz surface comprises an additional pattern forming part, it can form a desired pattern, and by adding long line type patterns unlike conventional quartz surfaces, it is possible to produce quartz surfaces showing patterns and textures which are more natural and close to natural stone.

The first additional pattern forming part is a portion to form a pattern by pressing a plate having at least one protrusion.

FIG. 4 is a view schematically showing a first additional pattern forming part according to one embodiment of the present application. As shown in FIG. 4, the first additional pattern forming part (3100) may comprise a plate having protrusion (3110), a second up-down adjustment unit (3120), and a second sensor (3130).

The plate having protrusion (3110) is a unit for forming a pattern on the semi-finished product of quartz surface by pressing the protrusion forming on the surface of the plate. The protrusion may comprise at least one protrusion, but is not limited thereto. For example, the plate having protrusion (3110) may realize the engraved pattern on the entire of semi-finished product of quartz surface by a single operation. At this time, the shape of the engraved pattern may be embodied according to the pattern of the protrusion shape, where the pattern of the protrusion may be controlled with a desired pattern to form the desired pattern of the quartz surface. In addition, the plate having protrusion (3110) is embossed may control the height and width of the protrusion on the surface of the plate to freely form the depth and width of the pattern formed on the quartz surface to the desired size.

The second up-down adjustment unit (3120) is a unit for adjusting the height of the plate having protrusion (3110). The second up-down adjustment unit (3120) may be located on the plate having protrusion (3110). The second up-down adjustment unit (3120) can freely adjust the depth and width of the intaglio formed on the semi-finished product of quartz surface to the desired size by adjusting the height of the plate having protrusion (3110).

The second sensor (3130) is a unit for sensing a position to form a pattern on the semi-finished product of quartz surface. The second sensor (3130) may be located on the transfer part (1000). By comprising the second sensor (3130) in the first additional pattern forming part (3100), it is possible to sense a starting point for forming a pattern on the semi-finished product of quartz surface conveyed by the transfer part (1000) and to form a pattern at a desired position.

The second additional pattern forming part is a portion to form a pattern by pressing plates, in which two or more slot shapes are embossed, in a caterpillar manner. The caterpillar manner means a manner in which a variety of slot-shaped steel plate pieces are connected in a chain shape and these are hung on a rotation drive device such as a wheel like a belt and operated by rotation with power.

FIG. 5 is a view schematically showing a second additional pattern forming part according to one embodiment of the present application. As shown in FIG. 5, the second additional pattern forming part (3200) may comprise a plate (3210) in which two or more slot shapes are embossed, a connecting structure (3220), a second rotation drive unit (3230), a debris removal unit (3240), a third up-down adjustment unit (3250) and a third sensor (3260).

The plate (3210) in which the two or more slot shapes are embossed is a unit for forming an engraved pattern on the semi-finished product of quartz surface by pressing the embossed two or more slot shapes.

The connecting structure (3220) is a tool for connecting slot shapes of the plate (3210) to each other. The connecting structure (3220) may be formed in a belt shape, so that the plate (3210) in which the two or more slot shapes are embossed may be rotationally driven. At this time, the connecting structure (3220) may be positioned so as to surround the outside of the plate (3210) in which the two or more slot shapes are embossed.

The second rotation drive unit (3230) is a unit for rotationally driving the plate (3210) in which the two or more slot shapes are embossed. The second rotation drive unit (3230) may be located inside the plate (3210) in which the two or more slot shapes are embossed, formed in the belt shape by the connecting structure (3220). For example, to rotationally drive the plate (3210) in which the two or more slot shapes are embossed, formed in the belt shape, in a tight state, two or more of the second rotation drive units (3230) may be located inside the plate (3210) in which the two or more slot shapes are embossed, without being limited thereto.

The debris removal unit (3240) is a unit for removing debris formed on the plate (3210) in which the two or more slot shapes are embossed. When the plate (3210) in which the two or more slot shapes are embossed is formed in a belt shape by the connecting structure (3220), the debris removal unit (3240) may be located on any one second rotation drive unit (3230) of two or more second rotation drive units (3230) positioned inside the plate (3210) in which the two or more slot shapes are embossed. As the second additional pattern forming part (3200) comprises the debris removal unit (3240), it is possible to form the engraved pattern on the semi-finished product of quartz surface in a desired form cleanly and to prevent mechanical defects occurring during pattern formation, by removing the debris generated while the second additional pattern forming part (3200) forms a pattern.

The third up-down adjustment unit (3250) is a unit for adjusting the height of the plate (3210) in which the two or more slot shapes are embossed. The third up-down adjustment unit (3250) may be located on the plate (3210) in which the two or more slot shapes are embossed. The third up-down adjustment unit (3250) may adjust the height of the plate (3210), in which the two or more slot shapes are embossed, to freely adjust the depth and width of the intaglio formed on the semi-finished product of quartz surface in a desired size.

The third sensor (3260) is a unit for sensing a position to form a pattern on the semi-finished product of quartz surface. The third sensor (3260) may be located on the transfer part (1000). By comprising the third sensor (3260) in the second additional pattern forming part (3200), it is possible to sense a starting point for forming a pattern on the semi-finished product of quartz surface conveyed by the transfer part (1000) and to form a pattern at a desired position.

The third additional pattern forming part is a portion to form a pattern by pressing a knife and a wheel.

FIG. 6 is a view schematically showing a third additional pattern forming part according to one embodiment of the present application. As shown in FIG. 6, the third additional pattern forming part (3300) may comprise a knife (3310), a wheel (3320), a first left-right movement drive unit (3330), a fourth up-down adjustment unit (3340) and a fourth sensor (3350).

The knife (3310) is a tool for forming an engraved pattern on the semi-finished product of quartz surface by pressing the knife (3310). The knife (3310) may have a satisfactory thin thickness to form a desired engraved pattern on the semi-finished product of quartz surface.

The wheel (3320) is a tool for forming an engraved pattern on the semi-finished product of quartz surface by pressing the wheel (3320), like the above-described knife (3310). The wheel (3320) may have a satisfactory thin thickness to form a desired engraved pattern on the semi-finished product of quartz surface.

The first left-right movement drive unit (3330) is a unit for moving the knife (3310) and the wheel (3320) to the left or right. The first left-right movement drive unit (3330) may be positioned with fourth up-down adjustment units (3340) as supports, which are described below, at each of both ends of the first left-right movement drive unit (3330) and the knife (3310) and the wheel (3320) may be each positioned on both sides where the fourth up-down adjustment units (3340) are not positioned. The first left-right movement drive unit (3330) can freely move the knife (3310) and the wheel (3320) to the left or right and thus can freely form a desired engraved pattern on the semi-finished product of quartz surface.

The fourth up-down adjustment unit (3340) is a unit for adjusting the height of the knife (3310) and the wheel (3320). As described above, the fourth up-down adjustment units (3340) may be positioned at each of both ends of the first left-right movement drive unit (3330). The fourth up-down adjustment unit (3340) can freely form the depth and width of the intaglio formed on the semi-finished product of quartz surface to the desired size by adjusting the height of the knife (3310) and the wheel (3320).

The fourth sensor (3350) is a unit for sensing a position to form a pattern on the semi-finished product of quartz surface. The fourth sensor (3350) may be located on the transfer part (1000). By comprising the fourth sensor (3350) in the third additional pattern forming part (3300), it is possible to sense a starting point for forming a pattern on the semi-finished product of quartz surface conveyed by the transfer part (1000) and to form a pattern at a desired position.

The fourth additional pattern forming part is a portion to form a pattern by pressing a plow.

FIG. 7 is a view schematically showing a fourth additional pattern forming part according to one embodiment of the present application. As shown in FIG. 7, the fourth additional pattern forming part (3400) may comprise a plow (3410), a second left-right movement drive unit (3420), a fifth up-down adjustment unit (3430) and a fifth sensor (3440).

The plow (3410) is a tool for forming an engraved pattern on the semi-finished product of quartz surface by pressing the plow (3410). The plow (3410) may have a satisfactory thin thickness to form a desired engraved pattern on the semi-finished product of quartz surface.

The second left-right movement drive unit (3420) is a unit for moving the plow (3410) to the left or right. The second left-right movement drive unit (3420) may be positioned with fifth up-down adjustment units (3430) as supports, which are described below, at each of both ends of the second left-right movement drive unit (3420) and the plow (3410) may be positioned on any one side where the fifth up-down adjustment units (3430) are not positioned. The second left-right movement drive unit (3420) can freely move the plow (3410) to the left or right and thus can freely form a desired engraved pattern on the semi-finished product of quartz surface.

The fifth up-down adjustment unit (3430) is a unit for adjusting the height of the plow (3410). As described above, the fifth up-down adjustment units (3430) may be positioned at each of both ends of the second left-right movement drive unit (3420). The fifth up-down adjustment unit (3430) can freely form the depth and width of the intaglio formed on the semi-finished product of quartz surface to the desired size by adjusting the height of the plow (3410).

The fifth sensor (3440) is a unit for sensing a position to form a pattern on the semi-finished product of quartz surface. The fifth sensor (3440) may be located on the transfer part (1000). By comprising the fifth sensor (3440) in the fourth additional pattern forming part (3400), it is possible to sense a starting point for forming a pattern on the semi-finished product of quartz surface conveyed by the transfer part (1000) and to form a pattern at a desired position.

In another example, as shown in FIG. 7, the fourth additional pattern formation unit (3400) may further comprise a color supply portion (3450).

The color supply portion (3450) is a portion for supplying a color raw material to the plow (3410) so as to form an engraved pattern on the semi-finished product of quartz surface and form a color in the pattern simultaneously. The color supply portion (3450) may be located to be connected to the opposite side of the plow (3410) adjacent to the semi-finished product of quartz surface.

In one example, the color forming part (4000) is a part for forming a color on the quartz surface composition in which the pattern is formed. By comprising the color forming part (4000) in the pattern forming device for quartz surface, it is possible to form the pattern and freely express the color on the pattern simultaneously.

FIG. 8 is a view schematically showing a color forming part according to one embodiment of the present application. As shown in FIG. 8, the color forming part (4000) may comprise a spray unit (4010), a third left-right movement drive unit (4020), a sixth up-down adjustment unit (4030) and a sixth sensor (4040).

The spray unit (4010) is a unit for spraying a color raw material onto a pattern formed on the quartz surface. One or more of the spray units (4010) may be included in the color forming part (4000). The color forming part (4000) can spray one or more of color raw materials onto the pattern formed on the quartz surface by being included in the spray unit (4010) in the above-mentioned range, whereby the quartz surface can be prepared, in which the color suitable for the pattern is freely expressed.

The third left-right movement drive unit (4020) is a unit for moving the spray unit (4010) to the left or right. The third left-right movement drive unit (4020) may be positioned with sixth up-down adjustment units (4030) as supports, which are described below, at each of both ends of the third left-right movement drive unit (4020) and the spray unit (4010) may be positioned on any one side where the sixth up-down adjustment units (4030) are not positioned. The third left-right movement drive unit (4020) can freely move the spray unit (4010) to the left or right and thus can freely express the color at a desired position on the semi-finished product of quartz surface.

The sixth up-down adjustment unit (4030) is a unit for adjusting the height of the spray unit (4010). As described above, the sixth up-down adjustment unit (4030) may be positioned at each of both ends of the third left-right movement drive unit (4020). The sixth up-down adjustment unit (4030) can freely adjust the spray width of the color raw material sprayed onto the pattern engraved on the semi-finished product of quartz surface to the desired size by adjusting the height of the spray unit (4010).

The sixth sensor (4040) is a unit for sensing a position to form a color on the semi-finished product of quartz surface. The sixth sensor (4040) may be located on the transfer part (1000). By comprising the sixth sensor (4040) in the color forming part (4000), it is possible to sense a starting point for forming a color on the semi-finished product of quartz surface conveyed by the transfer part (1000) and to form a color at a desired position.

The present application also relates to a pattern forming method for quartz surface. For example, the pattern forming method for a quartz surface relates to a method for forming a pattern in a quartz surface through the above-described pattern forming device for quartz surface. Therefore, details of the pattern formation of the quartz surface to be described below can be applied in the same manner as in the contents described in the pattern forming device for quartz surface.

An exemplary method for forming a pattern in a quartz surface of the present application may comprise a step of transferring, a step of forming a pattern and a step of forming a color.

The step of transferring is a step for transferring the semi-finished product of quartz surface to the step for forming a pattern and the step for forming a color, where the details of the step of transferring are as described in the transfer part of the patter forming device for quartz surface and thus are omitted.

The step of forming a pattern is a step of forming a pattern on the semi-finished product of quartz surface conveyed in the step of transferring, where the details of the step of forming a pattern are as described in the pattern forming part of the pattern forming device for quartz surface and thus are omitted.

The pattern forming method for quartz surface of the present application may further comprise a step of forming an additional pattern. The step of forming an additional pattern is a step of further forming at least one pattern on the semi-finished product of quartz surface in which a pattern is formed in the step of forming a pattern, where the step of forming an additional pattern may comprise a step of forming a first, second, third or fourth additional pattern. The details of the step of forming an additional pattern are as described in the additional pattern forming part of the pattern forming device for quartz surface and thus are omitted.

The step of forming a color is a step of forming a color in the semi-finished product of quartz surface having the pattern formed therein, where the details of the step of forming a color are as described in the color forming part of the pattern forming device for quartz surface and thus are omitted.

FIGS. 9 to 12 are images capturing quartz surface produced by the pattern forming device and method for quartz surface of the present application according to one embodiment. As shown in FIGS. 9 to 12, it can be confirmed that the quartz surface produced by the pattern forming device and method for quartz surface realizes various patterns and colors.

EXPLANATION OF REFERENCE NUMERALS

1000: transfer part
1010: support
1020: belt
1030: first rotation drive unit
2000: pattern forming part
2010: roller
2020: motor 2030: first up-and-down adjustment unit
2040: first sensor
3000: additional pattern forming part
3100: first additional pattern forming part
3110: plate having protrusion
3120: second up-down adjustment unit
3130: second sensor
3200: second additional pattern forming part
3210: plate in which two or more slot shapes are embossed
3220: connecting structure
3230: second rotation drive unit
3240: debris removal device
3250: third up-down adjustment unit
3260: third sensor
3300: third additional pattern forming part
3310: knife
3320: wheel
3330: first left-right movement drive unit
3340: fourth up-down adjustment unit
3350: fourth sensor
3400: fourth additional pattern forming part
3410: plow
3420: second left-right movement drive unit
3430: fifth up-down adjustment unit
3440: fifth sensor
3450: color supply portion
4000: color forming part
4010: spray unit
4020: third left-right movement drive unit
4030: sixth up-down adjustment unit
4040: sixth sensor

The invention claimed is:

1. A pattern forming device for quartz surface comprising:
a transfer part for transferring a semi-finished product of quartz surface;
a pattern forming part for forming a pattern on the semi-finished product of quartz surface conveyed by the transfer part;
an additional pattern forming part for further forming at least one pattern on the semi-finished product of quartz surface in which the pattern is formed in the pattern forming part; and
a color forming part for forming a color in the pattern of the semi-finished product of quartz surface formed in the pattern forming part,
wherein the pattern forming part, the additional pattern forming part and the color forming part are positioned with a serial structure in order on the transfer part,
wherein the pattern forming part comprises: a roller in which a disc shape or a spring shape with at least one curve is embossed; a motor for adjusting a speed of the roller; a first up-down adjustment unit for adjusting a height of the roller; and a first sensor for sensing a pattern formation position on a surface of the quartz surface.

2. The pattern forming device for quartz surface according to claim 1, wherein the transfer part comprises a support;
a belt for conveying the semi-finished product of quartz surface; and
a first rotation drive unit for rotating the belt.

3. The pattern forming device for quartz surface according to claim 1, wherein the additional pattern forming part comprises a first additional pattern forming part including a plate having at least one protrusion.

4. The pattern forming device for quartz surface according to claim 3, wherein the first additional pattern forming part comprises: a plate having at least one protrusion;
a second up-down adjustment unit for adjusting a height of the plate having at least one protrusion; and
a second sensor for sensing a pattern forming position on the semi-finished product of quartz surface.

5. The pattern forming device for quartz surface according to claim 1, wherein the additional pattern forming part comprises a second additional pattern forming part for pressing two or more plates, in which two or more slot shapes are embossed, in a caterpillar manner, to form a pattern.

6. The pattern forming device for quartz surface according to claim 5, wherein the second additional pattern forming part comprises: a plate in which two or more slot shapes are embossed;
a connecting structure for connecting the plate in which two or more slot shapes are embossed to each other;
a second rotation drive unit for rotating the plate in which two or more slot shapes are embossed;
a debris removal unit for removing debris formed on the plate in which two or more slot shapes are embossed;
a third up-down adjustment unit for adjusting a height of the plate in which two or more slot shapes are embossed; and
a third sensor for sensing a pattern formation position on the semi-finished product of quartz surface.

7. The pattern forming device for quartz surface according to claim 1, wherein the additional pattern forming part comprises a third additional pattern forming part for pressing a knife and a wheel to form a pattern.

8. The pattern forming device for quartz surface according to claim 7, wherein the third additional pattern forming part comprises: a knife for forming an intaglio on the semi-finished product of quartz surface;
a wheel for forming an intaglio on the semi-finished product of quartz surface;
a first left-right movement drive unit for moving the knife and the wheel to the left or right;
a fourth up-down adjustment unit for adjusting a height of the knife and the wheel; and
a fourth sensor for sensing a pattern formation position on the semi-finished product of quartz surface.

9. The pattern forming device for quartz surface according to claim 1, wherein the additional pattern forming part comprises a fourth additional pattern forming part for pressing a plow to form a pattern.

10. The pattern forming device for quartz surface according to claim 9, wherein the fourth additional pattern forming part comprises: a plow for forming an intaglio on the semi-finished product of quartz surface;
a second left-right movement drive unit for moving the plow to the left or right;
a fifth up-down adjustment unit for adjusting a height of the plow; and
a fifth sensor for sensing a pattern formation position on the semi-finished product of quartz surface.

11. The pattern forming device for quartz surface according to claim 10, wherein the fourth additional pattern forming unit further comprises a color supply unit for supplying a color raw material.

12. The pattern forming device for quartz surface according to claim 1, wherein the color forming part comprises: a spray unit for spraying one or more color raw materials;
a third left-right movement drive unit for moving the spray unit to the left or right;

a sixth up-down adjustment unit for adjusting a height of the spray unit; and a sixth sensor for sensing a color formation position on the semi-finished product of quartz surface.

* * * * *